United States Patent [19]

Garcia-Gardea

[11] Patent Number: 5,197,333
[45] Date of Patent: Mar. 30, 1993

[54] APPARATUS TO TEST THE RESISTENCE TO VIBRATION OF BRAKE BEAMS FOR RAILWAY CAR TRUCK ASSEMBLIES

[76] Inventor: Jesus E. Garcia-Gardea, Ave. Junco de la Vega #208, Col. Roma 64700, Monterrey, Nuevo León, Mexico

[21] Appl. No.: 733,312

[22] Filed: Jul. 22, 1991

[51] Int. Cl.⁵ .............................................. B06B 1/010
[52] U.S. Cl. .......................................... 73/666; 73/667
[58] Field of Search ................. 73/579, 667, 663, 666, 73/669, 808

[56] References Cited

U.S. PATENT DOCUMENTS

| | | | |
|---|---|---|---|
| 2,380,159 | 7/1945 | Eksergian | 73/667 |
| 2,705,889 | 4/1955 | Hock et al. | 73/667 |
| 3,782,185 | 1/1974 | Hassenauer et al. | 73/121 |
| 4,122,723 | 10/1978 | Levizzari et al. | 73/579 |

Primary Examiner—Hezron E. Williams
Assistant Examiner—Nashmiya Ashraf
Attorney, Agent, or Firm—Laurence R. Brown

[57] ABSTRACT

This invention relates to an apparatus to test the resistance to vibration of brake beams for railway car truck assemblies having a union frame, a side frame at each end of the union frame, each having front and rear ends, and a pair of beam carriers, each having front and side end as well as a receptacle in each of its ends to receive a side guide of a pair of brake beams. A pair of vibratory devices, each mounted on the front end of the respective beam carriers, are coupled through a transmission to a driver providing a rotatory movement for testing. The union frame, side frames and beam carriers which support a pair of brake beams to be tested, reproducing a railway car truck assembly.

3 Claims, 3 Drawing Sheets ics for resis-
APPARATUS TO TEST THE RESISTENCE TO VIBRATION OF BRAKE BEAMS FOR RAILWAY CAR TRUCK ASSEMBLIES

TECHNICAL FIELD

This invention relates to testing apparatus for resistance to vibration of brake beams of railway car truck assemblies having a union frame, a side frame at each end of said union frame, each presenting front and rear ends, a pair of beam carriers, each presenting front and side ends with a receptacle on each of its ends for receiving a side guide or a pair of brake beams. A pair of vibratory devices, coupled through a transmission has a driver providing a rotatory movement. The test equipment reproduces a railway car truck assembly.

BACKGROUND OF THE INVENTION

There are several methods for testing the vibration of different machines or vehicles in motion. To date, all of them have yield good results, however, they have the inconvenience that they don't test the vehicle when it is under actual movement conditions, for example, encountered on railroad tracks. Such circumstance prevents, a good test report since the behavior of a piece on the test machine is different from that of the same piece during routine work. Thus, one of the objectives of this invention is to provide a machine capable of testing the resistance to vibration of braking beams on railroad car trucks having the authentic possibility of repeating the real circumstances encountered in the routine movement of the brake beams.

DETAILED DESCRIPTION OF THE INVENTION

Figure 1:
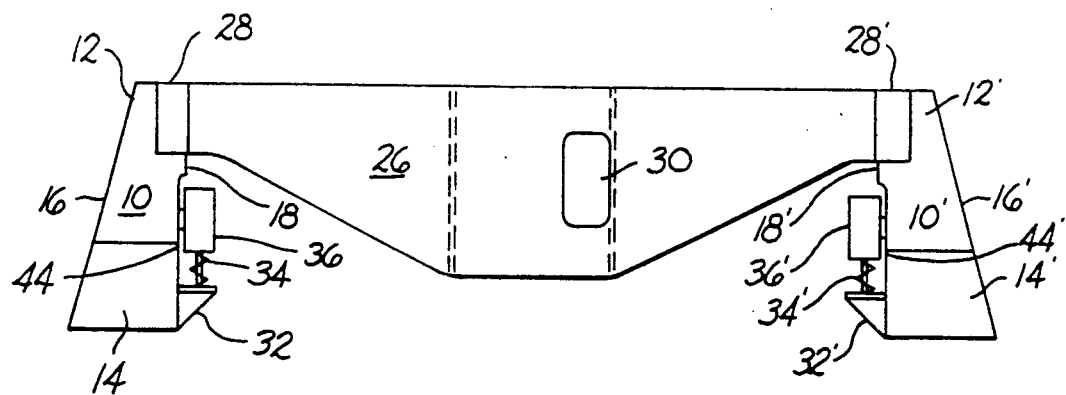
FIG. 1 is a frontal view of the apparatus.
Figure 2:
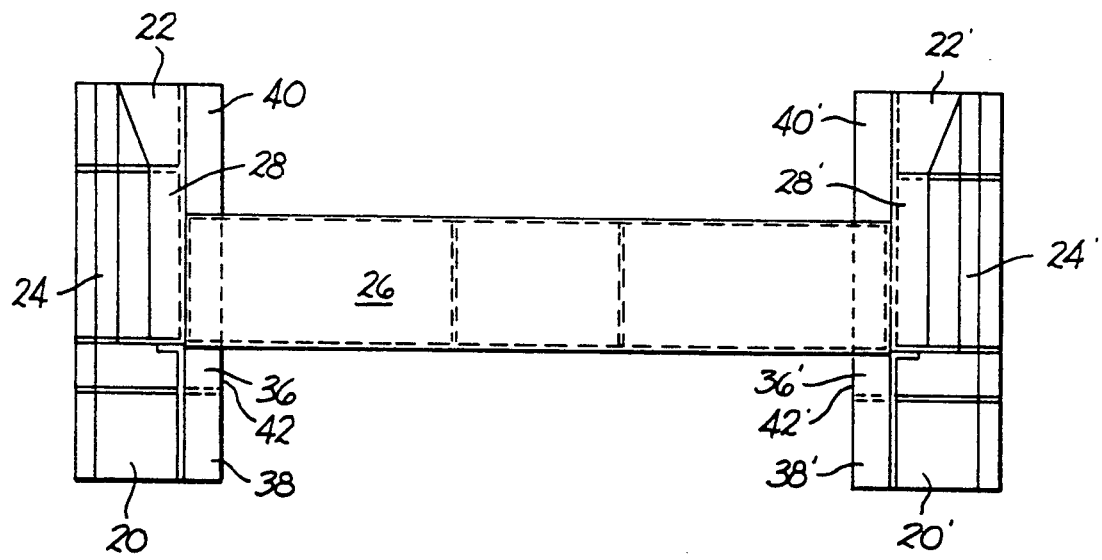
FIG. 2 is a top plan view of the apparatus.

Referring to the drawings, this apparatus for testing resistance to vibration of brake beams for railway car truck assemblies, comprises a combination of right (10') and left (10) supports opposite to each other, respectively with a right support and fastening plate (12') and a left support and fastening plate (12), and likewise having a right support plate (14') and a left support plate (14). External faces (16' and 16) of the support plates have an inclination of approximately 10° with respect to the base and internal faces have a notch on their upper sections supporting the ends of the bolster (26).

Coupled respectively to the right support and left support are supporting plates (32' and 32) for the right and left springs (34' and 34). Also coupled to supports right and left (10' and 10) are a right beam carrier (36') and a left beam carrier (36) which enable the apparatus to receive a pair of railway car brake beams to be tested. Each of said beam carriers (36' and 36) have a front end (38' and 38), a supporting plate (40' and 40) for the pivoting of the beam carriers and an internal face (42' and 42) located exactly in front of the corresponding supporting face (44' and 44). The beam carriers (36' and 36) are supported by their front end (38' and 38) above their respective springs (34' and 34) at the corresponding lateral frame (10' and 10) and at an intermediate oscillating portion on its posterior end (40' and 40).

Figure 3:
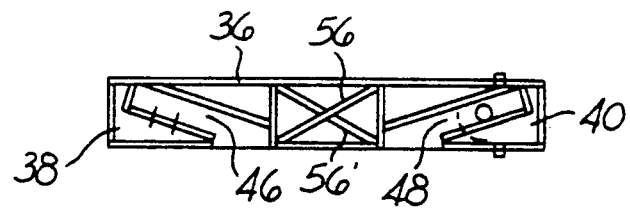
FIGS. 3 and 4 are detailed lateral views of beam carriers.
Figure 4:
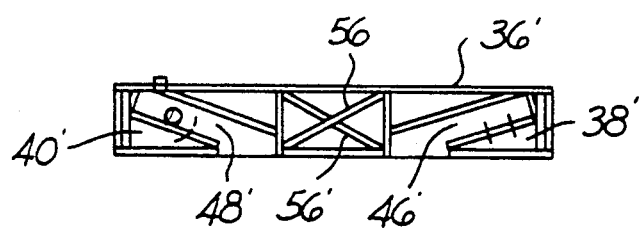
Figure 5:
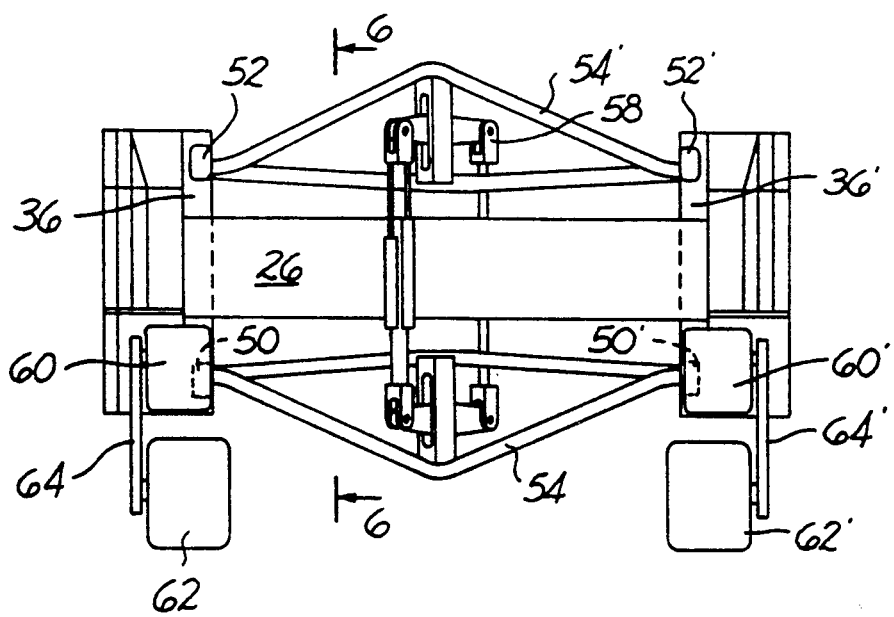
FIG. 5 is a top plan view of the assembled apparatus.

The beam carriers (36' and 36) (FIGS. 3, 4) have diagonal receptacles (46' and 46) receiving fastening means (48' and 48) on front and rear ends and a supporting plate (40' and 40) on its inner faces (42' and 42) in which the side guides (50' and 50) and (52' and 52) of the pair of brake beams for testing (54' and 54) are found (FIG. 5).

A pair of vibratory devices 60,60', each mounted on the top of the front end 38,38' of a corresponding beam carrier 36,36' loosely resting on the spring 34,34' are provided to impart a vibratory movement to the respective beam carrier 36, 36' and consequently to the brake beams mounted thereon.

Reinforcing plates (56' and 56) may be provided to provide structural strength.

WAY OF OPERATION

Figure 6:
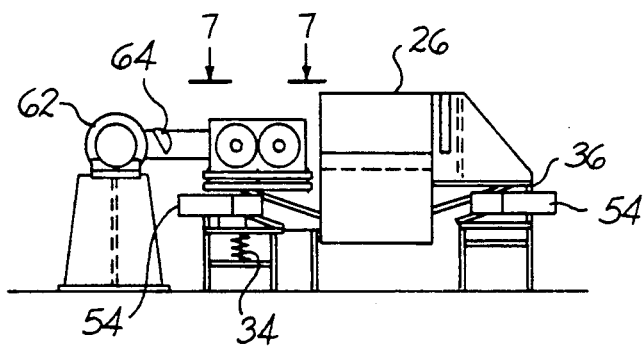
FIG. 6 is a lateral view of the line AA' of the apparatus in FIG. 5.

In order to test the brake beams (54' and 54) they are mounted on the right and left beam carriers (36' and 36) as shown in FIGS. 5 and 6, introducing the side guides (50' and 50) into the diagonal receptacles (46' and 46) which are retained by the fastening means (48' and 48) being coupled to one another by the slack adjuster 58 in order to fully simulate a railway car truck assembly. The vibratory boxes on the right (60') and left (60) axis for variable inertia are mounted in the front ends (38' and 38) on the corresponding right (36') and left (36) beam carriers which rest freely on the right and left springs (34' and 34). The vibratory devices (60', 60) for variable inertia of the axis make it possible to impart a vibratory movement to the respective beam carrier (36' and 36) and subsequently to the brake beams mounted over them.

Figure 7:
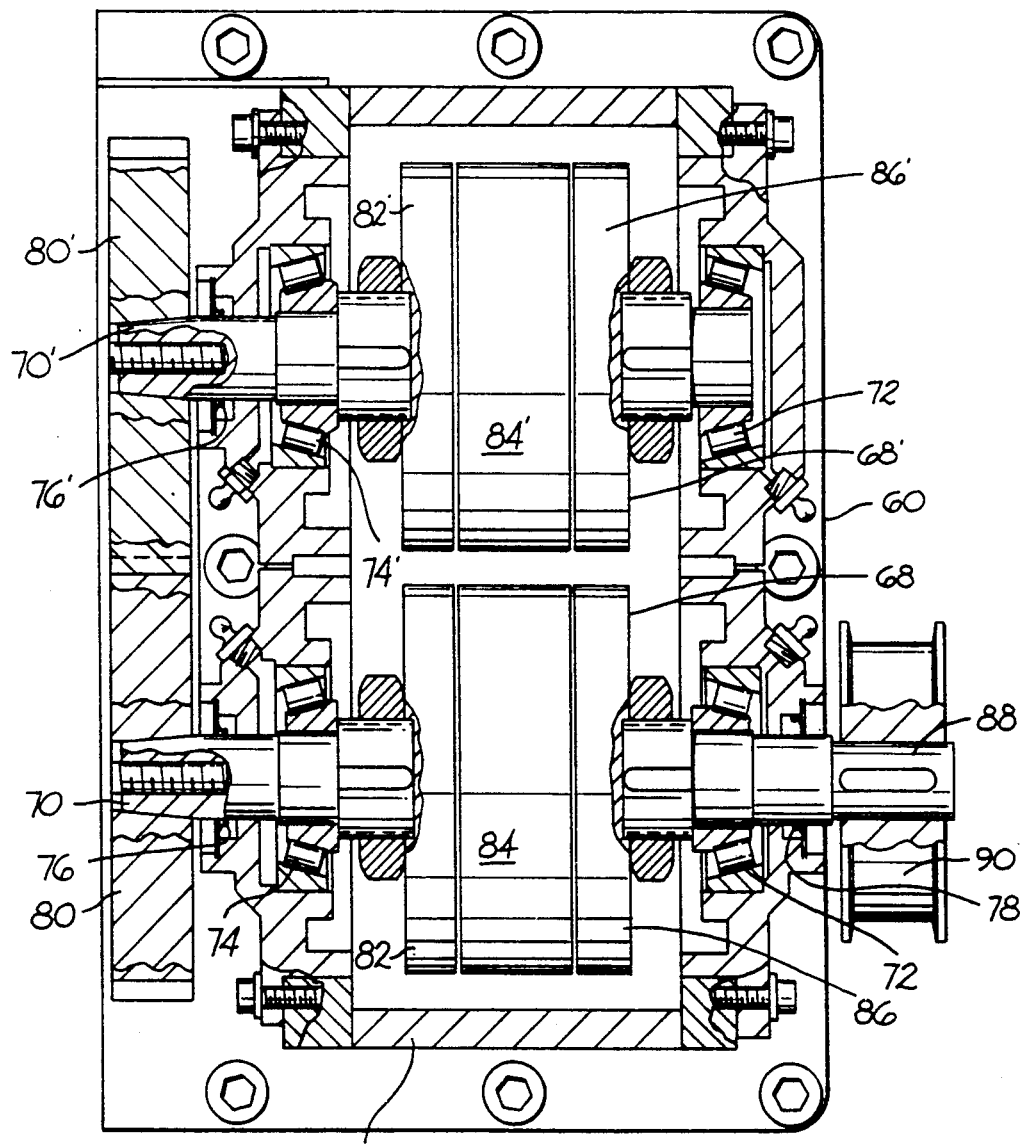
FIG. 7 is a detailed cross section of a vibratory box along line BB' of FIG. 6.

Each of these vibratory devices (60' and 60) can be of any type known in this field and, as shown in FIGS. 5, 6 and 7 each vibratory devices (60 and 60') is driven by a respective motor which can be electric (62' and 62) or by a transmission belt (64' and 64).

As shown in FIG. 7, the vibratory devices (60' and 60) comprise a casing (66) and first (68') and second vibratory assemblies (68) placed one beside the other within the casing (66). Each of them comprising a driving shaft (70' and 70) mounted within said casing (66) through respective conical bearings (72' and 72) and (74' and 74) and secured thereinto by means of "O" rings (76' and 76) which are secured to one another by the gears (80' and 80) mounted on the driving shaft ends.

Mobile discs (82' and 82) (84' and 84) (86' and 86) are eccentrically coupled to the driving shafts (70' and 70) in order to produce a reciprocal vertical vibratory movement when rotating. The vibration magnetude can be controlled by relatively comparing the eccentric masses. Shaft (70) includes a driving extension (88) at one of its ends and a transmission pulley (90) which by means of a belt or chain (64' and 64) will be mounted on the electric motor (62' and 62).

Upon activating the vibratory devices (60' and 60) mounted on the beam carriers, the brake beams previously installed are subjected to a movement that reproduces the vibration which a railway car truck assembly undergoes, and in this way it is possible to test its resistance to vibration.

A bolster (26) (FIG. 1), has a hole (30) through which the pistons or bars which may be required pass, and it has an upper supporting plate (28') for the right support and an upper support plate (28') for the left support.

What is claimed is:

1. Vibration generating equipment for use in testing brake beams for railway car truck assemblies under conditions simulating conditions encountered on railroad tracks, comprising in combination:

an assembly for simulating a railway car truck assembly with a pair of brake beams (54, 54') mounted at opposite ends into beam carriers (36, 36') extending from the ends of a bolster (26), and a set of two independently operable vibrators (60, 60') coupled to the respective beam carriers (36, 36') for imposing vibratory movement at the opposite ends of the brake beams.

2. The equipment of claim 1 wherein said beam carriers further comprise retaining channels (46, 46') for supporting guide members (50, 50') at opposite ends of the brake beams (54, 54'), said channels being disposed diagonally to a plane passed through said brake beams (54, 54'), and means mounting said vibrations (60, 60') at one end of the respective beam carriers (36, 36').

3. The equipment of claim 1 wherein said vibrators (60, 60') further comprise respective sets of eccentrically mounted disks (82, 84, 86, and 82', 84', 86') and means (62, 62') for rotating the discs.

* * * * *